(12) United States Patent
Dyer

(10) Patent No.: US 9,905,861 B2
(45) Date of Patent: Feb. 27, 2018

(54) SOLID-STATE RESERVE BATTERY ACTIVATED BY COMPRESSION

(71) Applicant: Lightening Energy, Dover, NJ (US)

(72) Inventor: Christopher K. Dyer, Madison, NJ (US)

(73) Assignee: Lightening Energy, Dover, NJ (US)

( * ) Notice: Subject to any disclaimer, the term of this patent is extended or adjusted under 35 U.S.C. 154(b) by 639 days.

(21) Appl. No.: 14/321,090

(22) Filed: Jul. 1, 2014

(65) Prior Publication Data

US 2015/0017488 A1   Jan. 15, 2015

Related U.S. Application Data

(60) Provisional application No. 61/845,296, filed on Jul. 11, 2013.

(51) Int. Cl.
*H01M 6/18* (2006.01)
*H01M 6/38* (2006.01)
*H01M 10/052* (2010.01)

(52) U.S. Cl.
CPC ............... *H01M 6/38* (2013.01); *H01M 6/18* (2013.01); *H01M 10/052* (2013.01)

(58) Field of Classification Search
None
See application file for complete search history.

(56) References Cited

U.S. PATENT DOCUMENTS

| | | | | | |
|---|---|---|---|---|---|
| 4,699,854 | A | * | 10/1987 | Snyder | H01M 6/38 429/114 |
| 4,783,382 | A | * | 11/1988 | Benedick | H01M 6/36 429/112 |
| 2009/0202891 | A1 | * | 8/2009 | Morganstein | F42C 11/008 429/80 |

* cited by examiner

*Primary Examiner* — Daniel Gatewood
(74) *Attorney, Agent, or Firm* — Davidson, Davidson & Kappel, LLC

(57) ABSTRACT

A reserve batter is provided. The reserve battery includes a housing; a battery inside the housing, the battery including an anode, a cathode and a solid electrolyte between the anode and the cathode; and a movable piece for sliding within the housing to compress the battery such that sufficient heat is generated within the battery to activate the solid electrolyte. Methods of activating a reserve battery are also provided.

11 Claims, 3 Drawing Sheets

SOLID-STATE RESERVE BATTERY ACTIVATED BY COMPRESSION

This claims the benefit of provisional Patent Application U.S. 61/845,296, filed Jul. 11, 2013 and hereby incorporated by reference herein.

The present disclosure relates generally to batteries and more specifically to reserve batteries.

BACKGROUND

Lithium based batteries are made from a large number of materials in which the cathode may be a lithium intercalating oxide or phosphate (nanoparticles) and the anode may be lithium metal or carbon or lithium titanium oxide. A lithium ion conducting electrolyte is provided between the anode and cathode. The lithium ion conducting electrolyte is generally an organic, ion-conducting liquid at ambient temperatures allowing power to be output on demand—i.e. the battery is "active." Reserve batteries are batteries which require activation before being able to output power. Reserve batteries may be activated by injecting a liquid electrolyte into the space between the anode and cathode before use. The activation may include breaking a separately partitioned ampoule full of electrolyte.

SUMMARY OF THE INVENTION

A reserve battery is provided. The reserve battery includes a housing; a battery inside the housing, the battery including an anode, a cathode and a solid electrolyte between the anode and the cathode; and a movable piece for sliding within the housing to compress the battery such that sufficient heat is generated within the battery to activate the solid electrolyte.

A method of activating a reserve battery including shock compressing a battery such that sufficient heat is generated within the battery to activate a solid electrolyte within the battery is also provided.

A method of activating a reserve battery including launching an artillery projectile to heat the reserve battery so as to activate a solid electrolyte within the reserve battery is also provided.

BRIEF DESCRIPTION OF THE DRAWINGS

The present invention is described below by reference to the following drawings, in which.

DETAILED DESCRIPTION

Embodiments of the invention include methods and devices for activating a solid state (SS) reserve battery by using a heating energy of shock compression. In embodiments suitable for military use, the shock compression may be produced by an artillery projectile on launch. The reserve battery may include a solid electrolyte (SE), typically a solid polymer electrolyte (SPE), which is a poor ion conductor at ambient temperatures, positioned between a solid anode electrode and a solid cathode electrode. In one embodiment, the reserve battery may be a lithium battery and the cathode may be a lithium intercalating oxide or phosphate (nanoparticles) and the anode may be lithium metal or carbon or lithium titanium oxide. The reserve battery may be subjected to very large compressive force of up to 20,000 g, which instantaneously reduces the volume and raises the temperature of the battery so enabling the solid electrolyte to conduct ions between the electrodes thus activating the battery to produce a power output. Some SPEs typically require a temperature in the range ~80° C. to conduct lithium ions. To extend shelf life, higher temperature requirement SPEs may be more appropriate for explosive compressions, for which temperature rises can be in the range 100-200° C. depending on the applied pressure and materials under compression. The reserve battery may thus not be dependent on the ambient temperature and may have a long shelf life at ambient temperatures until compression-activated.

Figure 1:
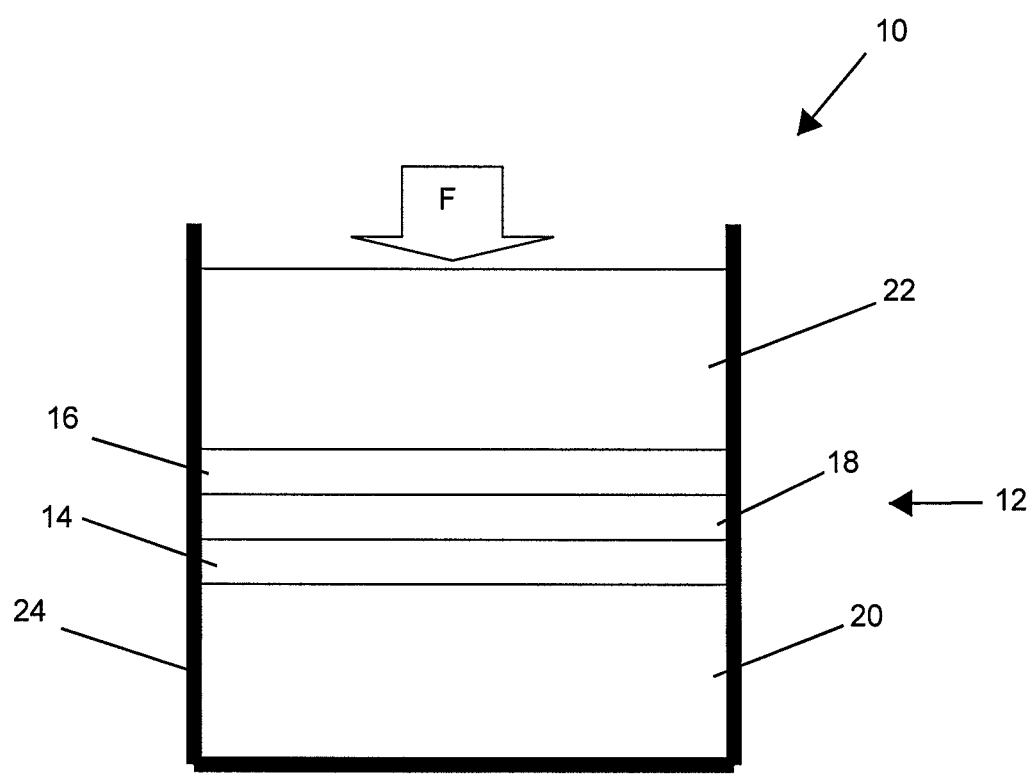
FIG. 1 shows a battery assembly in accordance with a first embodiment of the present invention.

FIG. 1 shows a reserve battery assembly 10 in accordance with an embodiment of the present invention. Reserve battery assembly 10 includes a battery 12 formed by an anode 14, a cathode 16 and a solid electrolyte 18 between anode 14 and cathode 16. A base 20, which is formed by an incompressible anvil layer, supports the battery 12 on a first side thereof and a movable piece in the form of a piston 22 contacts battery 12 on a second side thereof opposite anvil 20. Battery 12, base 20 and piston 22 are surrounded by a housing 24 to define a compression chamber 26 within housing 24. Housing 24 may be formed of an insulating material and may include a low friction surface on an inside of the insulating material. The low friction surface may be for example formed of Teflon such that piston 22 slides along the inner surface of housing 24 with minimal friction to maximize the compression of battery 12. Reserve battery assembly 10 is manufactured such that it is in an inactive state, such that ions are not transferred between anode 14 and cathode 16 through solid electrolyte 18.

To activate reserve battery assembly 10 such that battery 12 may be used to power an electronic device, which in one preferred embodiment is a military weapon, a very large compressive force F, for example 10,000 g, is applied to piston 22 to shock compress battery 12. Force F is strong enough to instantly reduce the volume occupied by battery 12 by an amount sufficient to generate an amount of heat within battery 12 to raise the temperature of solid electrolyte to enable solid electrolyte to conduct ions between electrodes 14, 16. Battery assembly 10 may then be immediately able to generate electricity and power an electronic device via terminals of battery assembly 10. Anvil 20 provides a counterforce, preventing battery 12 from being force through housing 24. As discussed above, in a preferred embodiment of the present invention, force F is provided by a recoil of a military weapon created by the launching of an artillery projectile.

The materials forming electrodes 14, 16 are selected to provide the required energy and rate of power delivery. In one embodiment, battery 12 may be a lithium ion battery and anode 14 may be formed of a lithium metal such as lithium titanium oxide and cathode 16 may be formed by lithium iron phosphate. In embodiments where anode 14 is formed of lithium metal, there may be a danger of internal short circuiting as the lithium may extrude through solid electrolyte 18. To prevent such extrusion, a separator may be provided between anode 14 and cathode 16 to reduce the direct electrode contact and electrical shorting. A ceramic separator may be beneficial since it is less compressible than an SPE. Use of such a separator between two "sheets" of SPE, each in contact with the respective anode and cathode may ensure good penetration of electrolyte 18 into each electrode 14, 16 without direct contact. Electrodes 14, 16 may also be impregnated with the polymer electrolyte during fabrication to ensure the best electrolytic contact (followed by UV crosslinking to harden the electrode containing electrolyte). Some microporosity of the separator is necessary to allow continuity of ion flow.

The capacity or "loading" of a single sheet electrode for lithium batteries is generally of the order of 0.5-2 mAh/cm$^2$, which is more than sufficient to support a power output of say 50 mA requirement at 3 volts for a few seconds from a 1 cm$^2$ electrode given a sufficiently high compression temperature.

Reserve battery assembly 10 may also include external thermal insulation to retain the heat and temperature following compression and possibly allow for a limited recharge of battery assembly 10 after initial use. Housing 24 may be non-metallic to reduce the possibility of indirect shorting by extrusion of the electrode material to contact the walls of housing 24.

For optimal shelf life, solid electrolyte 18 may be formed of an SPE with higher transition to ion conductance temperatures, e.g. 100 to 150° C., especially for applications requiring a sustained high temperature ambient (e.g., 60° C.).

Figure 2:
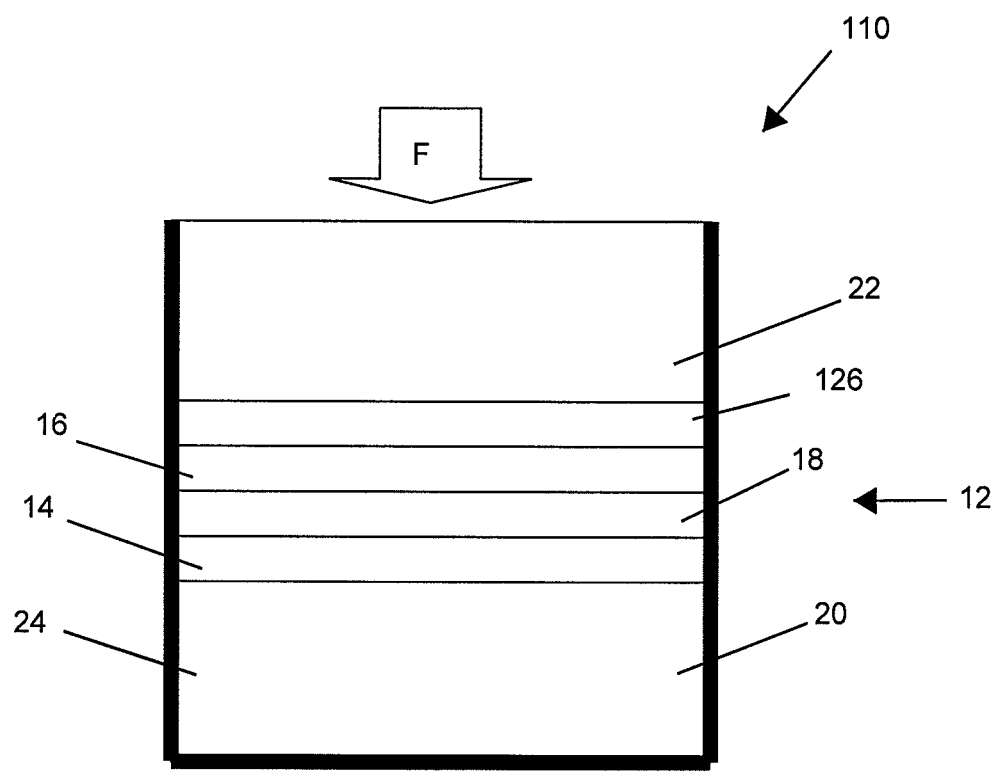
FIG. 2 shows a battery assembly in accordance with a second embodiment of the present invention.

FIG. 2 shows a reserve battery assembly 110 in accordance with another embodiment of the present invention. In addition to the components of reserve battery assembly 10, reserve battery assembly 110 also includes a mixture of exothermic reactants 120 to generate additional heat. In this embodiment, exothermic reactants 120 are provided between piston 22 and battery 12. As the instantaneous force F is applied to battery 12 via piston 22, exothermic reactants 126 are activated to provide further heat to solid electrolyte 18. This embodiment of reserve battery 110 may be particularly useful when solid electrolyte 18 is formed by a material having higher activation temperature and the heat created by the compression of battery 12 by force F is alone insufficient to activate solid electrolyte 18.

Figure 3:
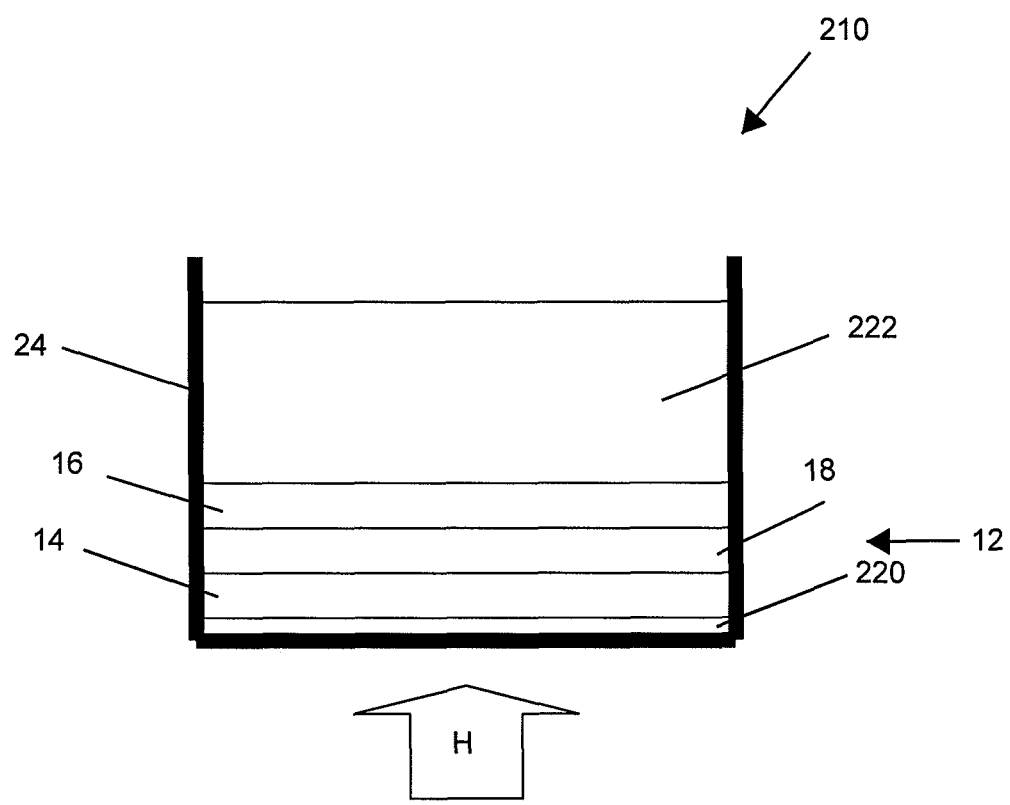
FIG. 3 shows a battery assembly in accordance with a third embodiment of the present invention.

FIG. 3 shows a reserve battery assembly 210 in accordance with another embodiment of the present invention. Similarly to reserve battery assembly 10, battery assembly 210 includes battery 12 inside of housing 24. In this embodiment, assembly 210 includes a base 220 for absorbing heat H from the ambient environment, which includes heat generated by a weapon upon the launch of an artillery projectile, which is transferred by battery 12 to activate electrolyte 18. A piece 222, which in this embodiment is immovable, is provided above battery 12 to hold battery 12 in place as the weapon is launched. In another embodiment, piece 222 may be formed as a movable piston receiving force F for the recoil of the weapon, while base 220 also absorbs heat generated by the launch of the projectile by the weapon. Base 220 may also be omitted and heat from the weapon may be transferred to battery 12 directly through housing 24.

While only a single battery 12 is shown in battery assemblies 10, 110, 210, these assemblies may also include two or more batteries 12 side by side on top of anvil 20 or base 220 to provide a high voltage output.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of activating a reserve battery comprising:
providing a battery including a solid polymer electrolyte between an anode and a cathode;
shock compressing the battery such that heat in a range of 100 to 200° C. is generated within the battery to activate the solid polymer electrolyte within the battery.

2. The method as recited in claim 1 wherein the shock compressing is caused by recoil of weapon launching an artillery projectile.

3. The method as recited in claim 1 wherein the shock compressing is caused by a force of from approximately 10,000 G-forces to approximately 20,000 G-forces.

4. The method as recited in claim 1 wherein the battery is lithium battery and the anode and cathode both include lithium.

5. The method as recited in claim 1 wherein the battery includes a movable piston and an incompressible anvil layer, the shocking compressing of the battery including moving the piston to sandwich the solid polymer electrolyte between the piston and the anvil layer.

6. The method as recited in claim 5 wherein the battery includes a housing made of insulating material surrounding the solid polymer electrode, the anode, the cathode, the piston and the anvil layer.

7. The method as recited in claim 6 wherein the housing includes a surface on the inside of the insulating material to allow sliding of the piston.

8. The method as recited in claim 7 wherein the surface is formed of polytetrafluoroethylene.

9. The method as recited in claim 5 wherein the battery includes exothermic reactants provided adjacent to the piston, the exothermic reactants generating heat during the shock compressing.

10. The method as recited in claim 1 wherein the solid polymer electrolyte is formed as two sheets with a ceramic separator provide therebetween.

11. The method as recited in claim 1 further comprising impregnating the anode and cathode with the solid polymer electrolyte during fabrication.

* * * * *